United States Patent [19]

Miyazawa

[11] Patent Number: 5,678,203

[45] Date of Patent: *Oct. 14, 1997

[54] READ/WRITE TERMINAL CONSTRUCTION FOR AN INFORMATION RECEIVING AND TRANSMITTING DEVICE

[75] Inventor: Atsushi Miyazawa, Suwa, Japan

[73] Assignee: Seiko Epson Corporation, Tokyo, Japan

[*] Notice: The portion of the term of this patent subsequent to Jul. 20, 2010, has been disclaimed.

[21] Appl. No.: 93,836

[22] Filed: Jul. 19, 1993

Related U.S. Application Data

[63] Continuation of Ser. No. 554,779, Jul. 20, 1990, Pat. No. 5,230,092.

[30] Foreign Application Priority Data

| Jul. 21, 1989 | [JP] | Japan | 1-189379 |
| Oct. 4, 1989 | [JP] | Japan | 1-117036 |
| May 24, 1990 | [JP] | Japan | 2-134653 |

[51] Int. Cl.$^6$ ............................................. H04B 1/08
[52] U.S. Cl. ............................ 455/90; 455/186.1; 455/351
[58] Field of Search ........................... 455/89, 90, 127, 455/343, 347, 348, 349, 186.1; 324/760; 439/289, 660, 929

[56] References Cited

U.S. PATENT DOCUMENTS

| 4,172,993 | 10/1979 | Leach | 324/760 |
| 4,225,819 | 9/1980 | Grau et al. | 324/415 |
| 4,426,619 | 1/1984 | Demand | 324/760 |
| 4,792,986 | 12/1988 | Garner et al. | 455/89 |
| 4,903,330 | 2/1990 | Ishiguro et al. | 455/186 |
| 4,969,206 | 11/1990 | Desrochers | 455/89 |
| 5,052,943 | 10/1991 | Davis | 439/660 |
| 5,155,860 | 10/1992 | McClure | 455/89 |
| 5,230,092 | 7/1993 | Mayazawa | 455/89 |

FOREIGN PATENT DOCUMENTS

| 0 276 403 | 8/1988 | European Pat. Off. |
| 0 298 720 | 1/1989 | European Pat. Off. |
| 63 556 | of 1984 | Japan |
| 54 825 | 3/1989 | Japan |
| 129 626 | 5/1989 | Japan |
| 170 229 | 7/1989 | Japan |
| 2 000 381 | 1/1979 | United Kingdom |

*Primary Examiner*—Edward F. Urban
*Attorney, Agent, or Firm*—Stroock & Stroock & Lavan

[57] ABSTRACT

A device for at least one of receiving and transmitting information is provided. The device housing having a front and rear casing is provided with a battery housing therein. At least one terminal element through which at least a portion of the information is written into and/or read from the device is positioned in the battery housing for access when the cover of the battery housing is removed. The at least one terminal element is arranged between respective regions of the battery casing and the front casing, extending essentially parallel to and proximate to the front casing.

11 Claims, 11 Drawing Sheets

READ/WRITE TERMINAL CONSTRUCTION FOR AN INFORMATION RECEIVING AND TRANSMITTING DEVICE

This application is a continuation of application Ser. No. 07,554,779, filed on Jul. 20, 1990, which issued as U.S. Pat. No. 5,230,092 on Jul. 20, 1993, entitled READ/WRITE DEVICE AND APPARATUS AND METHOD FOR READING FROM AND WRITING INTO THE DEVICE.

BACKGROUND OF THE INVENTION

This invention relates to a radio receiver, radio transmitter and radio transceiver, and more particularly to a read/write device and apparatus and method for reading information from and writing information into such a device wherein the information includes, but is not limited to, identification codes.

As shown in FIG. 13, a conventional read/write device 205 includes a plurality of read/write terminals 200. Device 205 also includes an opening 207. The plurality of read/write terminals 200 are accessible through opening 207 when a battery cover (not shown) is removed. The plurality of read/write terminals 200 are arranged substantially orthogonally to opening 207.

As shown in FIG. 14, an apparatus for reading into and writing from a read/write device includes a plurality of read/write terminals 201 in the form of leaf springs. As shown in FIG. 15, in reading from and writing into read/write device 205, read/write terminals 201 are inserted through opening 207 of device 205 so as to slidably engage corresponding individual terminals 200. Terminals 201 must be pushed through opening 207 so as to travel in a direction substantially orthogonal to the direction in which terminals 201 contact terminals 200.

Shown in FIG. 16 is another conventional read/write device 290 which includes an opening 300 and a programmable read only memory (PROM) 301. Opening 300 is formed in a battery casing 303 and PROM 301 is connected through a socket and an auxiliary substrate 302 to a main substrate (not shown).

Since the plurality of terminals 200 of device 205 are arranged substantially orthogonal to opening 207, which are accessible upon removal of a battery casing cover, a plurality of guide slits formed in a circuit substrate of device 205 in the vicinity of terminals 200 are required to permit read/write terminals 201 or read/write terminals 401 to be placed next to read/write terminals 200 for engagement therewith. Additional spacing within device 205 is required for these guide slits. To accommodate such spacing, the package density (i.e. the number of elements within a given area) of the circuit substrate of device 205 must be maintained at a relatively low level.

Dust and other foreign substances can enter opening 207 during reading and writing operations, detrimentally affecting the operation of device 205. Since device 205 must include guide slits, the elements within device 205 must be spread out. Therefore, the overall package density of device 205 is also lowered. Where the thickness of the housing enclosing a device such as a receiver is limited, insufficient spacing therein to permit access of terminals 200 by terminals 201 or 401 can result.

Typically, when read/write terminals 201 are made in the form of leaf springs, terminals 201 are made from materials which are not very rigid (i.e. do not have a high material strength) to accommodate the narrow spacing within device 205 and to ensure successful contact with terminals 200. Consequently, terminals 201 must be handled with great care. The speed at which terminals 201 are inserted into device 205 must be reduced (i.e., at a lower efficiency). The durability of terminals 201 is also relatively low. Conventional read/write devices, such as device 205, which use a PROM having a predetermined size or thickness and which are not rewritable require use of a socket to accommodate the PROM making the PROM difficult to handle.

It is therefore desirable to provide a read/write device and apparatus and method for reading from and writing into the device so that the package density of the circuit substrate and overall packaging density of the read/write device is relatively high. The design of the read/write device should prevent dust and other foreign particles from entering the device. The read/write apparatus for reading and writing information such as, but not limited to, identification codes, should not require a high level of care to operate and should have read/write terminals of relatively high durability. The read/write apparatus also should be relatively small in size, light in weight and have a relatively low manufacturing cost.

SUMMARY OF THE INVENTION

Generally speaking, in accordance with the invention, a device such as a receiver, transmitter or transceiver is enclosed within a housing and includes a circuit substrate having a plurality of terminals. The housing has an opening which lies in a plane which is substantially parallel to the plane formed by the terminals of the circuit substrate. Access to the opening is provided by removing a protective covering from the housing of the device. Since the opening is substantially parallel rather than perpendicular to the circuit substrate terminals, there is no need for guide slits within the device to accommodate the read/write terminals of the apparatus. The package density of the circuit substrate and the overall device can be increased.

The opening within the device serves as an opening for a battery casing. At the bottom of the battery casing are a plurality of apertures corresponding to and directly above the terminals of the circuit substrate. The plurality of apertures are dimensioned to have a smaller diameter and are sufficiently spaced from the terminals of the circuit substrate to prevent dust and other foreign substances, including a user's fingers from coming into contact with the terminals of the circuit substrate. Access to the terminals of the circuit substrate for reading information from or writing information into the device is possible only when the battery is removed from the battery casing.

The information which is read from or written into the device includes an identification code. Generally, the identification code must be included within a signal received by the device to operate the device.

In another aspect of the invention, an apparatus for writing information into and reading information from a device includes a base for receiving and supporting the device. The device is enclosed within a housing having a pair of side walls. The device is easily and simply mounted onto the apparatus by placing the sidewalls of the device against a pair of guide walls of the apparatus. Consequently, a high degree of accuracy in mounting the device onto the apparatus is not required. The apparatus also includes a plurality of read/write terminals which correspond in number to the number of terminals of the circuit substrate. Since the opening within the device lies in a plane which is substantially parallel to the plane formed by the terminals of the circuit substrate, the read/write terminals of the apparatus need not be in the form of leaf springs to ensure contact is made between the read/write terminals of the apparatus and the terminals of the circuit substrate of the device. The read/write terminals of the apparatus can have a high material strength and therefore are far more durable than comparable read/write terminals of a conventional apparatus.

The apparatus also includes a rotatable arm, the read/write terminals of the apparatus being connected to one end of the arm. Consequently, the read/write terminals of the apparatus can be moved towards and away from the base.

In reading information from and writing information into a device, the arm is first moved away from the base of the apparatus. The device is then positioned on a table of the apparatus by placing the side walls of the apparatus against the guide walls of the apparatus. The guide walls are substantially orthogonal to each other and can be integrally formed on the table. The arm of the apparatus is then moved toward the table whereby the read/write terminals of the apparatus pass through the opening of the battery casing and the apertures at the bottom of the battery casing so as to engage the terminals of the circuit substrate of the device.

Accordingly, it is an object of the invention to provide an improved read/write device which has a circuit substrate with a relatively high density of elements resulting in a reduction in the overall size of the device.

It is another object of the invention to provide an improved apparatus for reading from and writing into a read/write device which does not require a high level of care, can be operated at a relatively high speed and includes read/writes terminals of high durability.

It is a further object of the invention to provide a read/write apparatus for reading into and writing from a read/write device which is relatively small in size, relatively low in weight and has a relatively low manufacturing cost compared to a conventional read/write apparatus.

Still other objects and advantages of the invention will, in part, be obvious and will, in part, be apparent from the specification.

The invention accordingly comprises several steps in a relation of one or more such steps with respect to each of the others, and the apparatus embodying features of construction, a combination of elements and arrangements of parts which are adapted to effect such steps, all as exemplified in the following detailed disclosure and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

Figure 1:
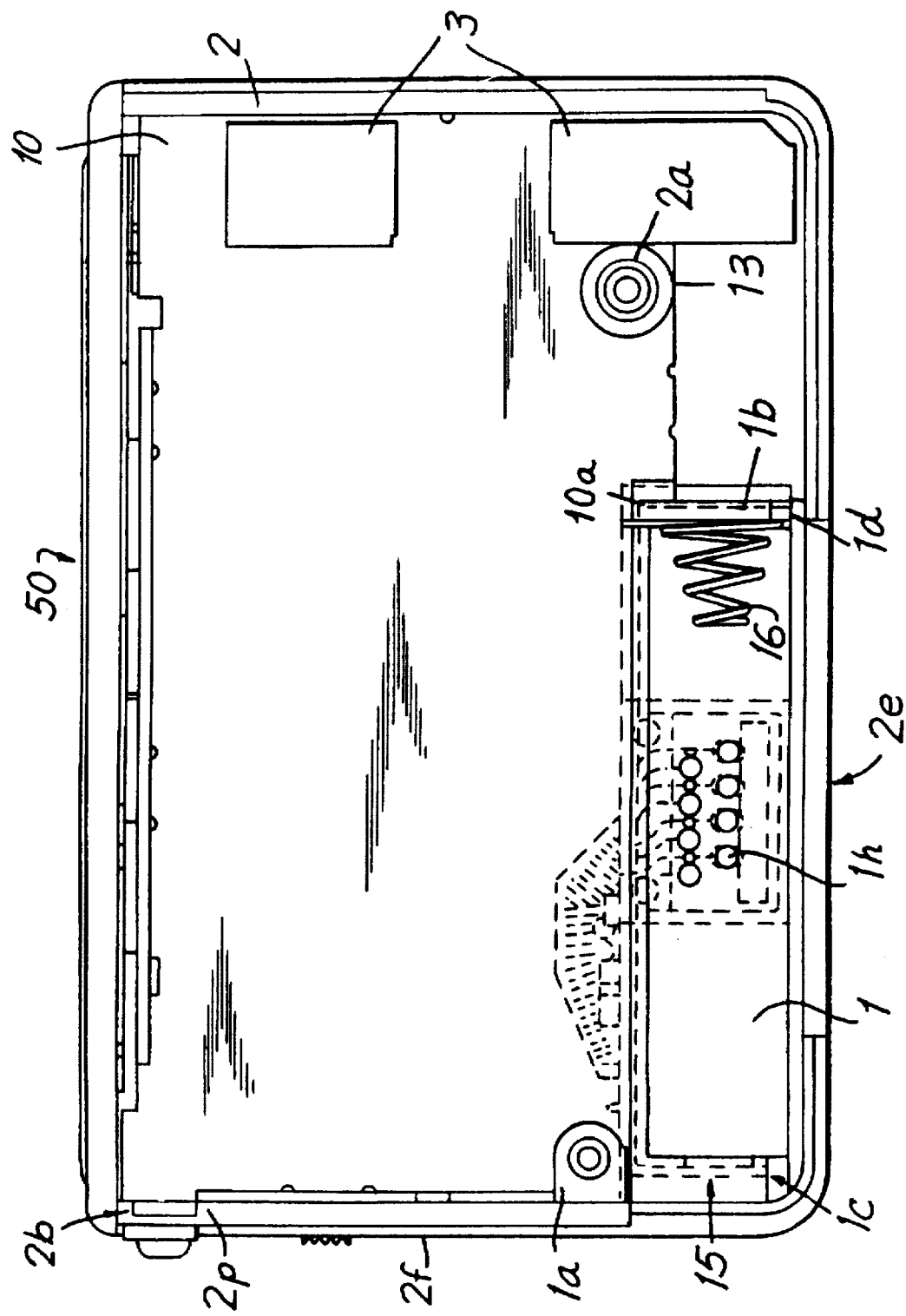
FIG. 1 is a plan view of an identification code read/write device in accordance with one embodiment of the invention.

Shown in FIG. 1 is a read/write device such as, but not limited to, a portable radio receiver 50 with a battery cover, battery rear casing cover and fixing screws for the cover removed. Receiver 50 is of the selectively-callable type, that is, a receiver which selectively receives transmitted information based on a predetermined identification code. Receiver 50 includes a battery casing 1 positioned, as shown in FIG. 1, at the bottom left corner of a front casing cover 2 and an antenna 3 positioned along the right edge of front casing cover 2. A circuit substrate 10 extends in a plane substantially parallel to front casing cover 2 and is supported by a guide protrusion 2a and a guide groove 2b. Guide protrusion 2a is formed integrally with front casing cover 2 and guide groove 2b is formed in a left wall 2p of front casing cover 2.

A spacer 13, which is supported by guide protrusion 2a, maintains a predetermined gap between circuit substrate 10 and a rear casing cover (not shown). An additional spacer 1a is integrally formed with battery casing 1. Receiver 50 also includes a battery plus (+) terminal 15 and a battery minus (−) terminal 16.

Battery casing 1 includes a plurality of slits 1b formed in the back face and adjacent side faces of battery casing 1. Slits 1b are guided in two directions of a plane (i.e., directions of slits 1b along the back face and adjacent side face) through engagement with a peripheral notch portion 10a of circuit substrate 10 (as also shown in FIG. 2).

Battery casing 1 also includes an integrally formed battery plus (+) terminal guide 1c and a battery minus (−) terminal guide 1d for guiding battery plus (+) terminal 15 and battery minus (−) terminal 16, respectively. Battery casing 1 is effectively supported relative to circuit substrate 10 through the connection of battery plus (+) terminal guide 1c and battery minus (−) terminal guide 1d to battery plus (+) terminal 15 and battery minus (−) terminal 16. Battery casing 1 is secured to circuit substrate 10 by rear casing cover fixing screws (not shown), at least one of which engages with spacer 1a.

Figure 2:
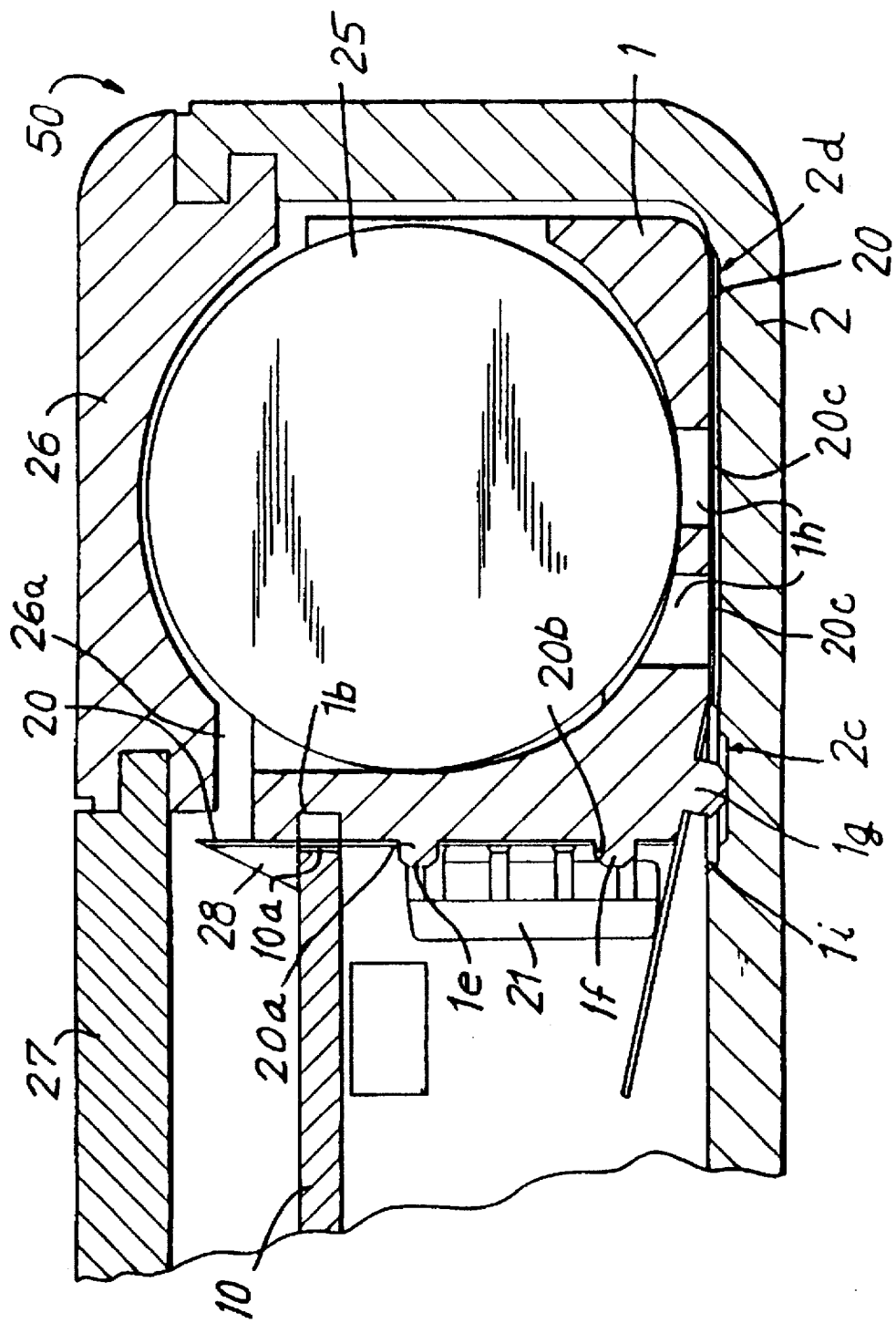
FIG. 2 is a fragmentary sectional view including the battery casing of the device shown in FIG. 1.

FIG. 2 is a fragmentary sectional view of device 50 which includes battery casing 1. An additional flexible circuit substrate 20 is positioned on the exterior surface of battery casing 1. A storage element (i.e. memory device) 21 for storing the receiver identification code is positioned on circuit 20 between circuit substrate 10 and front casing cover 2. The identification code can be written into the storage element 21. Preferably, an electrically erasable programmable read only memory (EEPROM) of the 8-terminal dual in-line package (DIP) type is used for storage element 21. It is to be understood that storage element 21 need not be an 8-terminal DIP type and can be mounted to circuit substrate 20 using any well known technique.

A pair of protrusions 1e and 1f, which are formed on the back face of battery casing 1, guide circuit substrate 20 by extending through a pair of holes 20a and 20b in circuit substrate 20, respectively. A protrusion 1g, which is formed at the lower edge of battery casing 1, serves to position a bottom portion of battery casing 1 or circuit substrate 20. A plurality of holes 1h such as, but not limited to eight, are formed in the bottom portion of battery casing 1. Holes 1h are arranged in a zigzag fashion to permit packaging of a high density of write terminals. A reduction in the size of both device 50 and, as explained below, an apparatus for reading into or writing from device 50 results. Device 50 also includes a battery 25 seated in battery casing 1, a battery cover 26 covering battery cover 25 and a rear casing 27.

A plurality of terminals 20c on circuit substrate 20 are positioned directly below and correspond to the plurality of holes 1h so as to permit access to storage element 21 for reading from and writing into the latter. Terminals 20c are gold plated to provide minimal resistance and a high level of conductivity for information travelling to and from storage element 21 through terminals 20c.

Holes 1h have a relatively small diameter to prevent the fingers of a user when inserting or removing battery 20 from battery casing 1 from touching one or more terminals 20c. Accordingly, short circuiting or the like of circuitry including storage element 21 is prevented. The read/write operation of storage element 21 cannot be performed unless battery 25 is removed from battery casing 1. Therefore, during a read/write operation charging of battery 25 can be prevented. One or more soldering portions 28 are positioned between circuit substrate 20 and circuit substrate 10 and define individual islands providing electrical connections therebetween.

Circuit substrate 10 is arranged substantially orthogonal to the back face of battery casing 1. Peripheral notches 10a are spaced slightly apart from circuit substrate 20. Holes 1h, which are formed in the bottom portion of battery casing 1, are centrally located between battery plus (+) terminal 15 and battery minus (−) terminal 16 as shown in FIG. 1.

Circuit substrate 20 is bonded and secured in the vicinity of protrusion 1g to battery casing 1. Protrusion 1g is provided at the lower edge of battery casing 1. Circuit substrate 20 is also bonded and secured in the vicinity of holes 1h.

Protrusion 1g extends through a flat recess or chamfer portion 1i. Recess 1i is formed in the lower back face of battery casing 1 and in combination with a corresponding flat relief recess 2c formed in front casing cover 2 prevents having to increase the thickness of receiver 50 in order to accommodate protrusion 1g.

A flat recess 2d formed in front casing cover 2 serves as a relief for circuit substrate 20. As illustrated in FIG. 2, substrate 20 can be arranged with all elements on one side of the substrate (i.e., a single sided substrate) which reduces the manufacturing cost of device 50.

Figure 17:
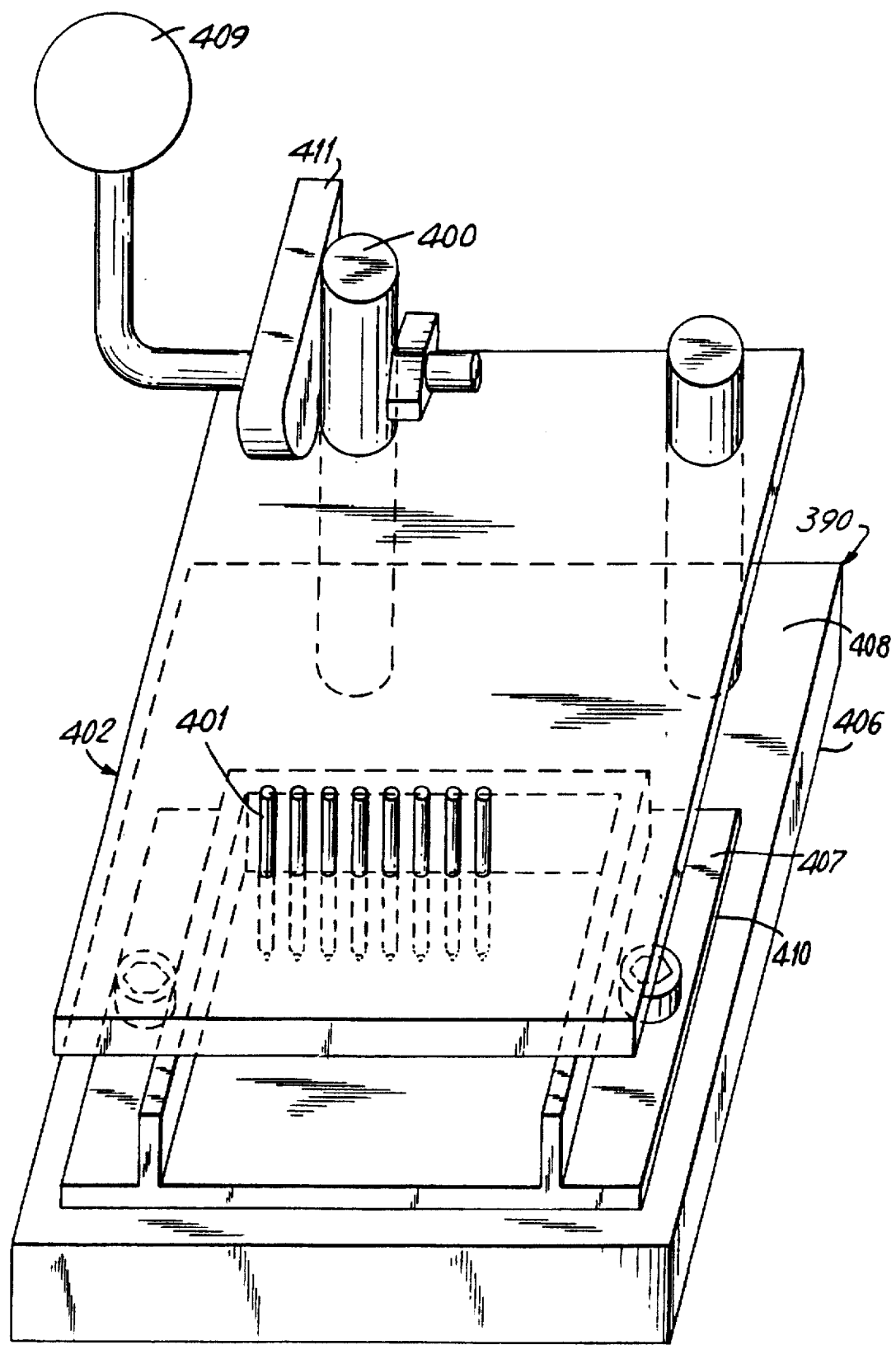
FIG. 17 is a perspective view of another embodiment of a read/write apparatus.

FIG. 17 discloses a read/write apparatus 390 for reading into and writing from a conventional read/write device.

Apparatus 390 includes a slide guide 400 which rises in a substantially vertical direction from a face 408 of a base 406. Apparatus 390 also includes a stage 402 having read/write terminals 401. Stage 402 is operable for moving up and down vertically with respect to a face 407 of a table 410 by controlling the position of a handle 409 coupled to a cam assembly 411.

Read/write apparatuses, such as apparatus 390, for reading from and writing into device 205 require that stage 402, which includes read/write terminals 401, be mounted on apparatus 390 to permit vertical movement with respect to table face 407. Base 406 and slide guides 400 of apparatus 390 should also be fixed (i.e., rigid) relative to stage 402. However, because of such operating requirements, apparatus 390 is relatively large in size, relatively heavy in weight, includes parts which are difficult to machine and otherwise manufacture and has a relatively high cost. Accordingly, an improved apparatus as shown in FIGS. 3–11 is disclosed.

Figure 3:
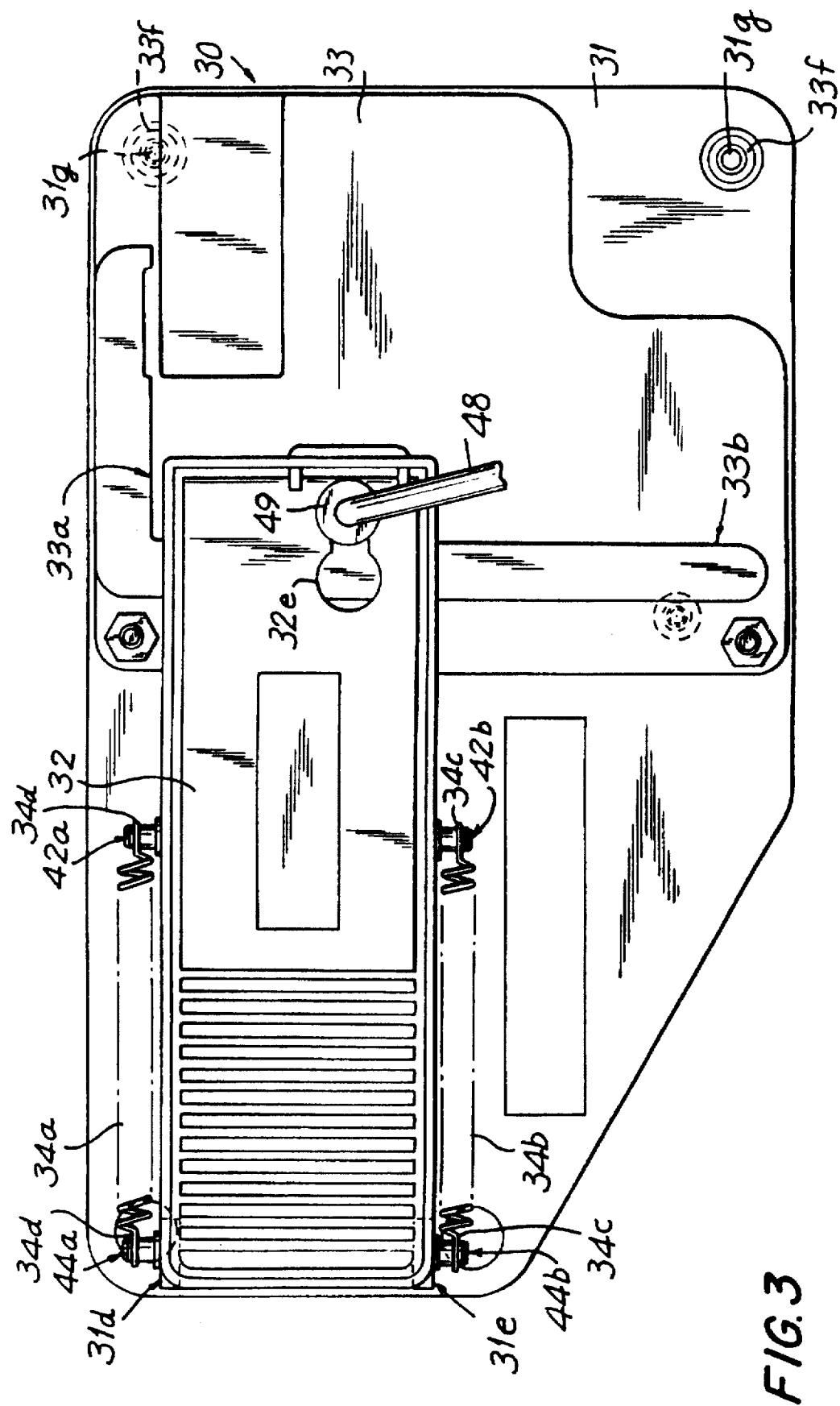
FIG. 3 is a plan view of an identification code read/write apparatus in accordance with the invention.

As shown in FIG. 3, an apparatus 30 for reading from and writing into receiver 50 includes a base 31, an arm 32 and a pallet 33 serving as a table. Pallet 33 includes a pair of walls 33a and 33b extending upwardly from pallet 33 in directions which are substantially orthogonal to each other. Walls 33a and 33b serve to guide a pair of sides 2f and 2e of front casing cover (i.e., outer casing) 2. More particularly, walls 33a and 33b serve to guide and properly position device 50 when placed on pallet 33 of apparatus 30.

Figure 4:
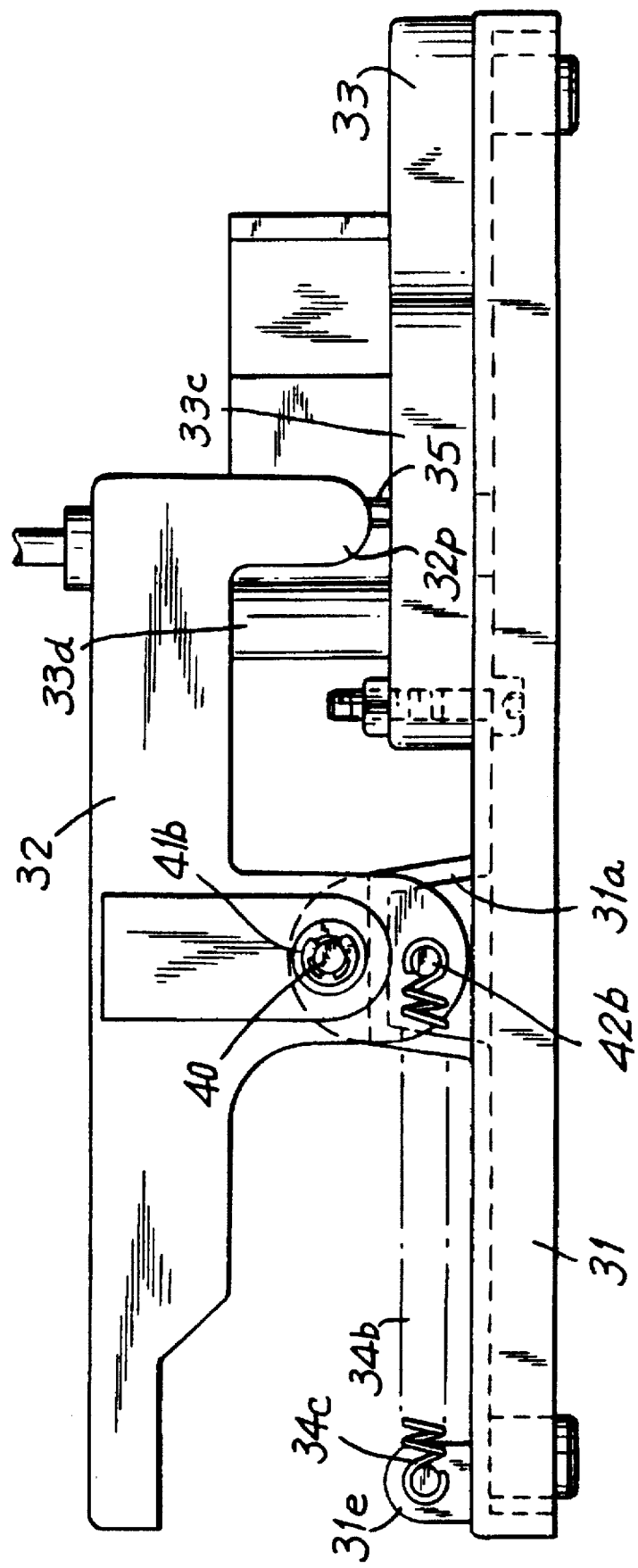
FIG. 4 is a front elevational view of the apparatus shown in FIG. 3.

As shown in FIGS. 3 and 4 a pair of tensile coil springs 34a and 34b serve to bias a plurality of read/write terminals 35 extending downwardly from a distal end 32p of arm 32 toward a table base 33c of pallet 33. Base 31 includes a rotation bearing protrusion portion 31a integrally formed on base 31. A rotation limiting portion 33d limits the rotation of arm 32 toward pallet 33 by serving as a stop for arm 32. With arm 32 resting against rotation limiting portion 33d, terminals 35 are in position for reading information from or writing information into device 50.

Figure 5:
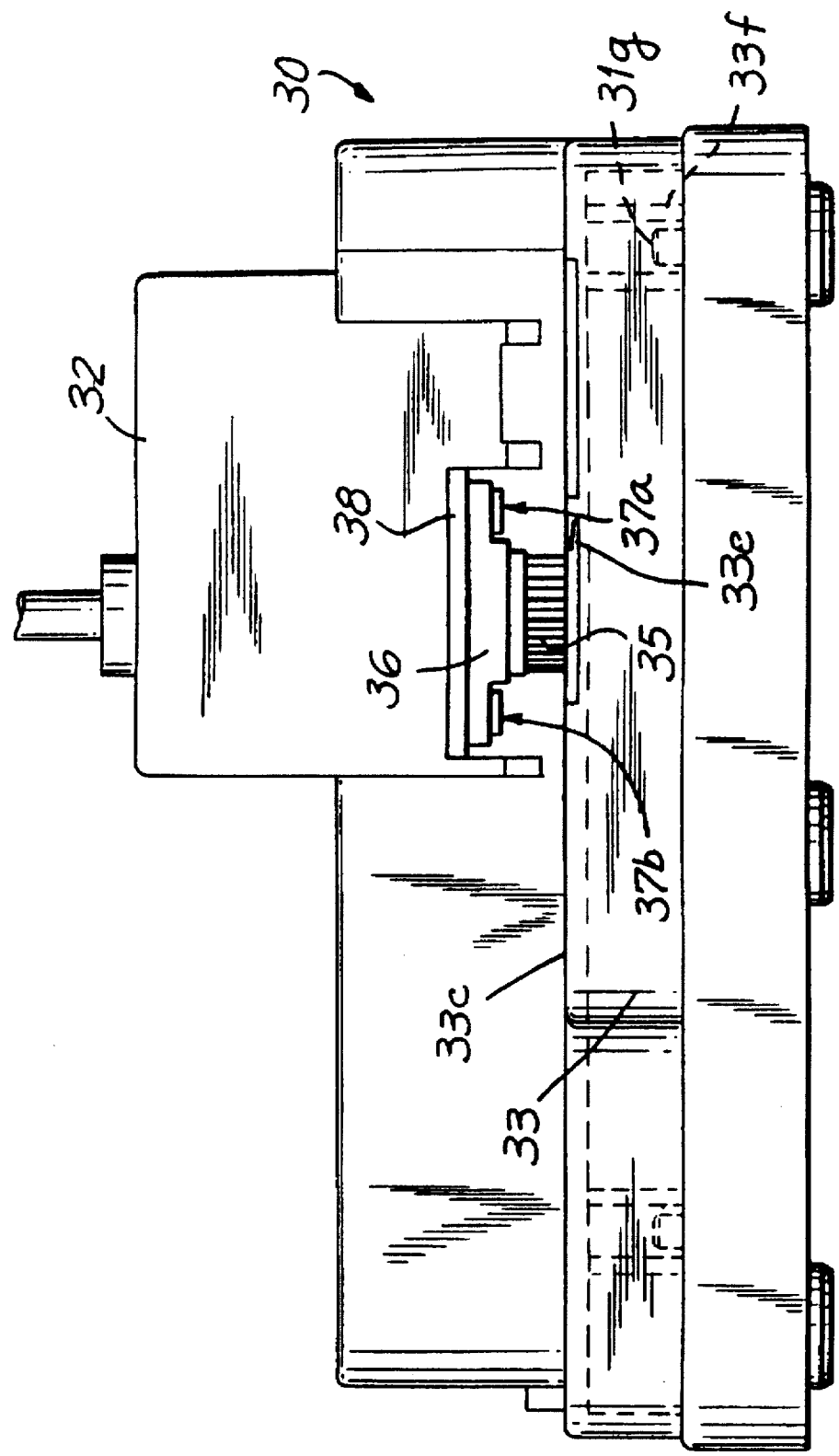
FIG. 5 is a right side elevational view of the apparatus shown in FIG. 3.

As shown in FIG. 5, which illustrates the right side elevational view of apparatus 30 shown in of FIG. 3, a holder 36 secures terminals 35 to arm 32. A pair of screws 37a and 37b, or other suitable fixing elements, secure holder 36 through a substrate 38 to arm 32. A flat recess 33e serves as a relief for terminals 35 and is formed in table face 33c of pallet 33.

Terminals 35 are spring bars which compensate for vertical positional error relative to table base 33c when terminals 35 are inserted through holds 1h of device 50 for making contact with terminals 20c of substrate 20. Preferably, the tips of terminals 35 are substantially spherical and gold plated to improve their durability and reliability in reading and writing of information.

Figure 6:
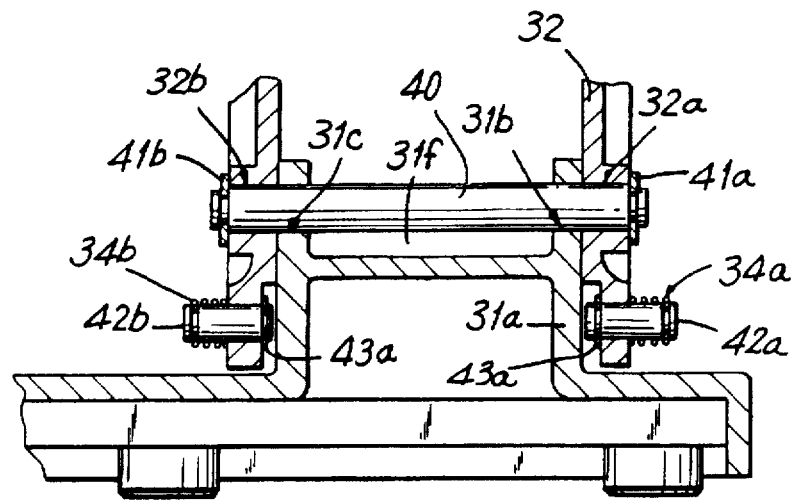
FIG. 6 is a fragmentary sectional view of the rotation bearing protrusion of the apparatus shown in FIG. 4.

FIG. 6 illustrates rotation bearing protrusion portion 31a. A rotary shaft 40 rotatably extends through a pair of horizontal holes 31b and 31c of rotation bearing protrusion portion 31a. Arm 32 also includes a pair of horizontal holes 32a and 32b located along the side edges of arm 32. Rotation bearing protrusion portion 31a is rotatably supported by rotary shaft 40 and thereby permits arm 30 to pivot towards and away from pallet 33 about rotary shaft 40. A pair of E-shaped retaining rings 41a and 41b seated in a pair of grooves formed at both ends of rotary shaft 40 prevent rotary shaft 40 from slipping out from holes 31b and 31c.

A pair of retaining members 42a and 42b serve to catch and hold the pair of hook portions 34c and 34d of tensile coil spring 34a and 34b, respectively. A pair of E-shaped retaining rings 43a and 43b prevent retaining members 42a and 42b and arm 32 from becoming dislodged from apparatus 30. A pair of retaining members 44a and 44b, shown in FIG. 3, are identical to retaining members 42a and 42b. A pair of E-shaped retaining rings (not shown) for preventing retaining members 44a and 44b from coming off protrusions 31d and 31e of base 31 are identical to the E-shaped retaining rings 41a, 41b, 43a and 43b shown in FIG. 6. By standardizing the shape of the retaining rings, the number of different types of parts and manufacturing costs of apparatus 30 can be decreased.

A flat recess 31f shown in FIG. 6, is formed in an upper portion of rotation bearing protrusion portion 31a for decreasing the contact area of rotary shaft 40 with rotation bearing protrusion portion 31a. By providing flat recess 31f, machining of rotation bearing protrusion portion 31a is simplified. Furthermore, by providing flat recess 31f in rotation bearing protrusion portion 31a, variations in the turning force required to rotate arm 32 are reduced.

Figure 7:
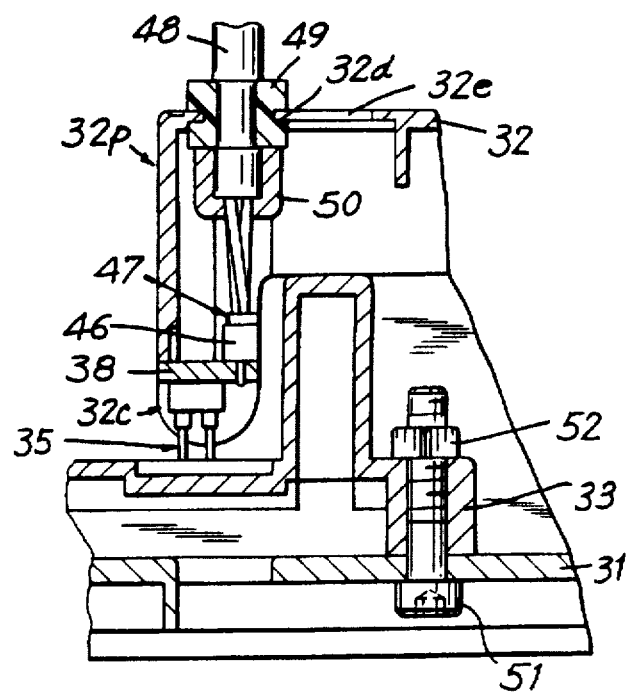
FIG. 7 is a fragmentary sectional view of the arm of the apparatus shown in FIG. 3.

Referring now to FIG. 7, distal end 32p of arm 32 includes a guide portion 32c formed integrally with arm 32 and is similar in function to a battery receiving portion of battery casing 1 shown in FIG. 1. Since receiver 50 is basically positioned and guided by guide portion 32c, receiver 50 can be readily mounted on pallet 33. Undesirable interference between terminal 35 and receiver 50 is thereby minimized. A socket 46 is soldered to substrate 38. A housing 47 is detachably secured to socket 46. A cable 48 is detachably secured by a bushing 49 to a slit portion 32d of arm 32. A sealing member 50 prevents cable 48 from coming off bushing 49. Preferably, bushing 49 is made from a non-migratable elastic material to prevent cable 48 and arm 32 from discoloring and deteriorating. A hexagonal socket head cap screw 51 extends through pallet 33 and is secured by a hexagonal nut 52 for connecting pallet 33 to base 31. Screw 51 is spaced slightly away from pallet 33 and base 31. A notched portion 32e of arm 32 receives and holds bushing 49. Notch portion 32e has a shape substantially identical to the outer shape of bushing 49 as shown in FIG. 3.

Figure 8:
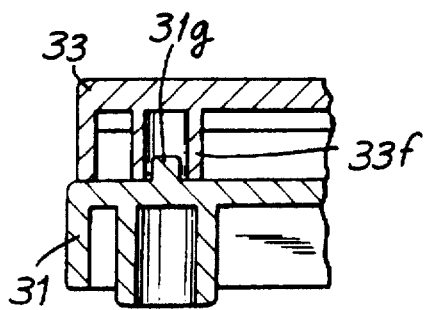
FIG. 8 is a fragmentary sectional view of a guide protrusion of the apparatus shown in FIG. 3.

As shown in FIG. 8, a guide protrusion portion 31g (also shown in FIG. 3) is guided by a guide protrusion 33f of pallet 33. Guide protrusion 33f is formed integrally with pallet 33. A slight gap between guide protrusion 33f and guide protrusion portion 31g exits to permit positional adjustment between terminal 35 and receiver 50. The combination of guide protrusion 31g and guide protrusion 31f is provided at the upper and lower right hand corners of pallet 33 as shown in FIG. 3. Accordingly, pallet 33 can be easily and readily placed on base 31.

Figure 9:
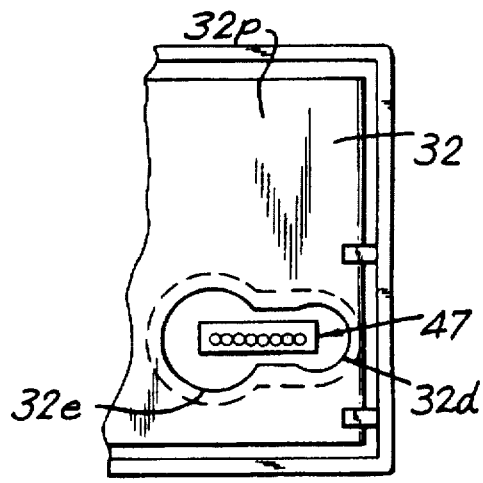
FIG. 9 is a fragmentary plan view of a housing of the apparatus shown in FIG. 3.

FIG. 9 illustrates distal end portion 32p of arm 32 in which housing 47 is inserted inside slit portion 32d and notch portion 32e. Once housing 47 has been pushed beyond slit portion 32d and notch portion 32e, bushing 49 is inserted in notch portion 32e and secured in split portion 32d. Since bushing 49 and slit portion 32d are dimensioned so that bushing 49 frictionally engages split portion 32d, bushing 49 is securedly held by split portion 32d and does not move about during operation of apparatus 30.

Figure 10:
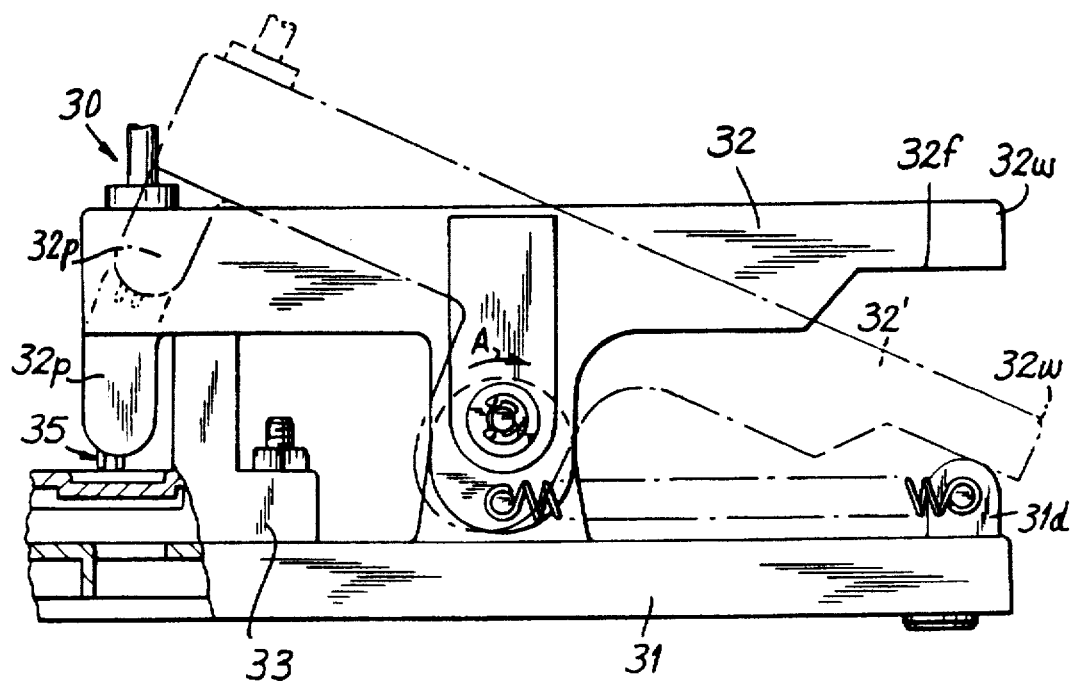
FIG. 10 is a fragmentary side elevational view, partially in cross-section, of the apparatus shown in FIG. 3.

As shown in FIG. 10, by depressing a rear end 32w of arm 32, illustrated as a dot-dash line 32', distal end 32p is rotated away from pallet 33 in a direction denoted by an arrow A. In rotating arm 32, a notch 32f contacts a protrusion 31d of base 31. Notch 32f is formed on the lower side of rear end 32w. Protrusion 31d is integrally formed on base 31 and serves as a stop to limit the rotational position of arm 32 as rear end 32w is depressed. When notch 32f is in contact with protrusion 31d, distal end 32p of arm 32 is at its maximum distance from pallet 33.

Figure 11:
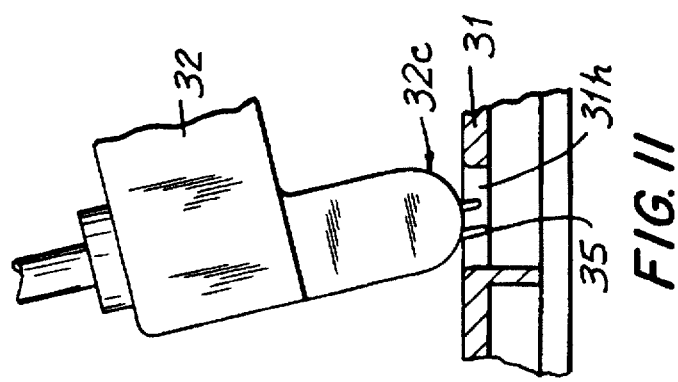
FIG. 11 is a fragmentary side elevational view of the arm of the apparatus shown in FIG. 3.
Figure 13:
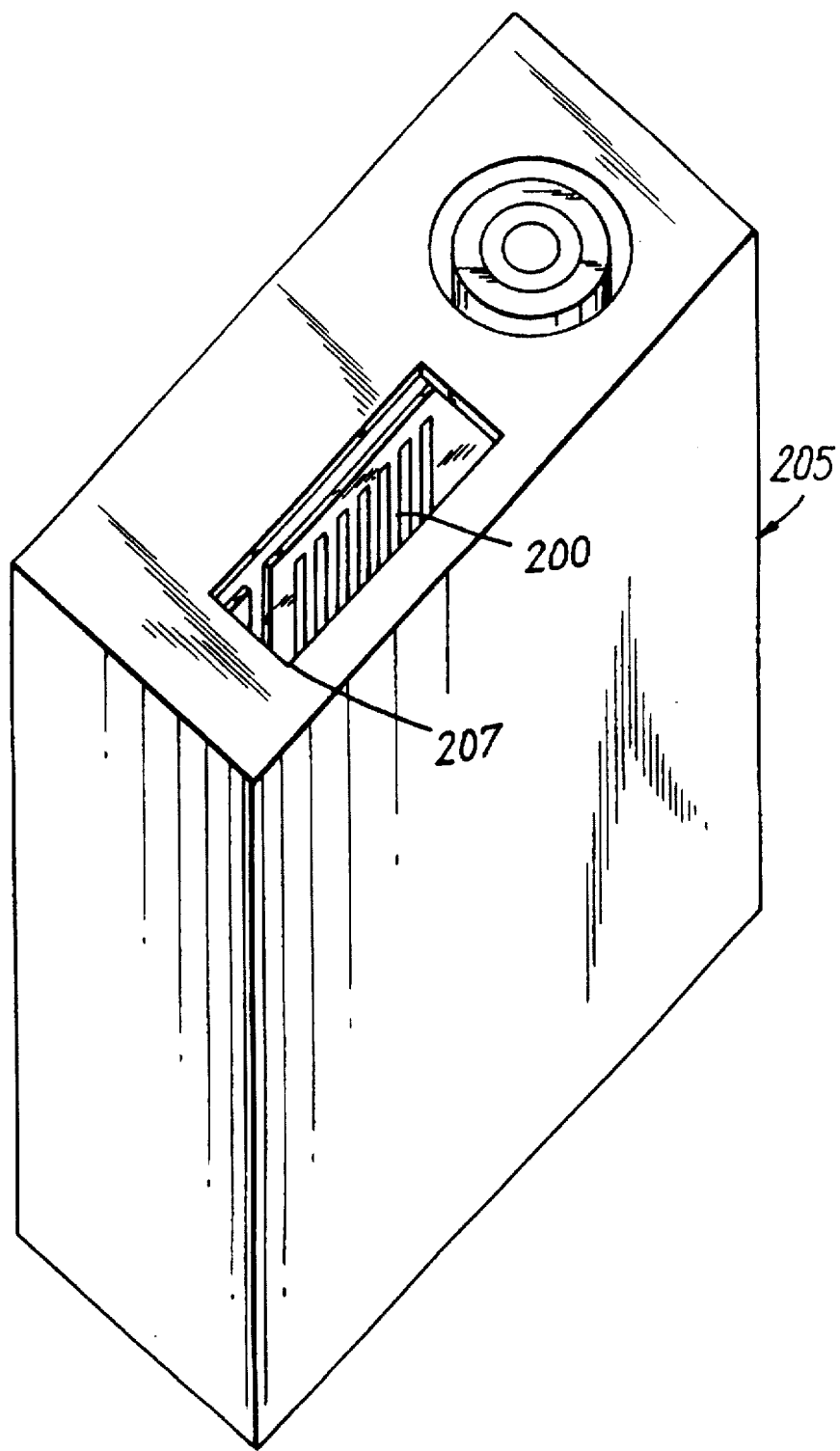
FIG. 13 is a perspective view of a conventional portable, selectively callable radio receiver.
Figure 14:
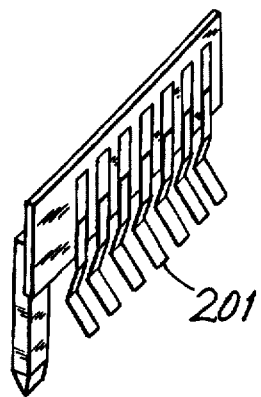
FIG. 14 is a perspective view of a plurality of read/write terminals included within a conventional read/write apparatus.
Figure 15:
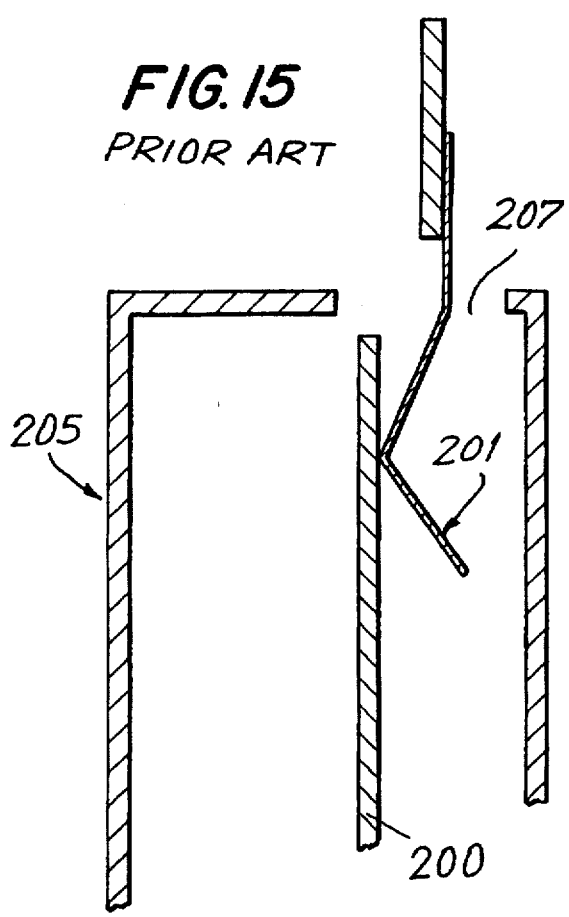
FIG. 15 is a fragmentary sectional view of the read/write terminals of FIG. 14 inserted within the read/write device of FIG. 13.
Figure 16:
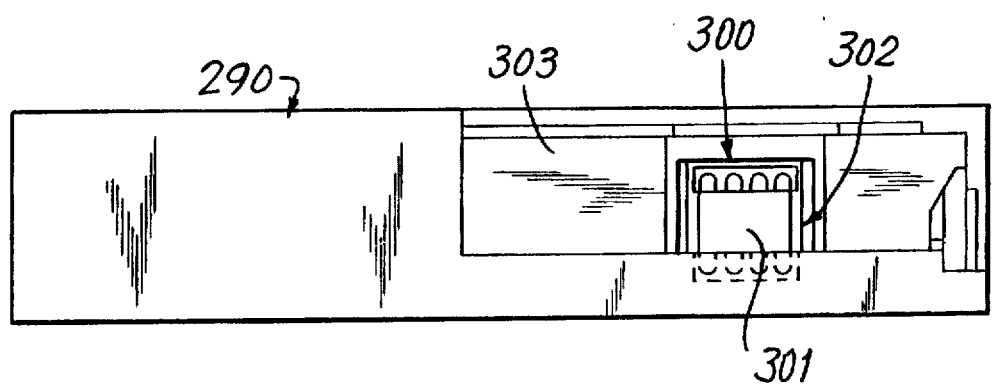
FIG. 16 is another conventional portable, selectively-callable radio receiver.

As shown in FIG. 11, when arm 32 is permitted to rotate toward base 31 with pallet 33 removed from apparatus 30, terminal 35 extends into a flat recess 31h. Flat recess 31h serves as a relief for terminal 35. Typically, flat recess 31h is a simple opening extending through base 31. Excessive rotation of arm 32 is prevented by guide portion 32c of arm 32 coming into contact with the edge of flat recess 31h, which is formed in the upper face of base 31. Consequently, no pressure is exerted on terminal 35 when pallet 33 is removed.

Figure 12:
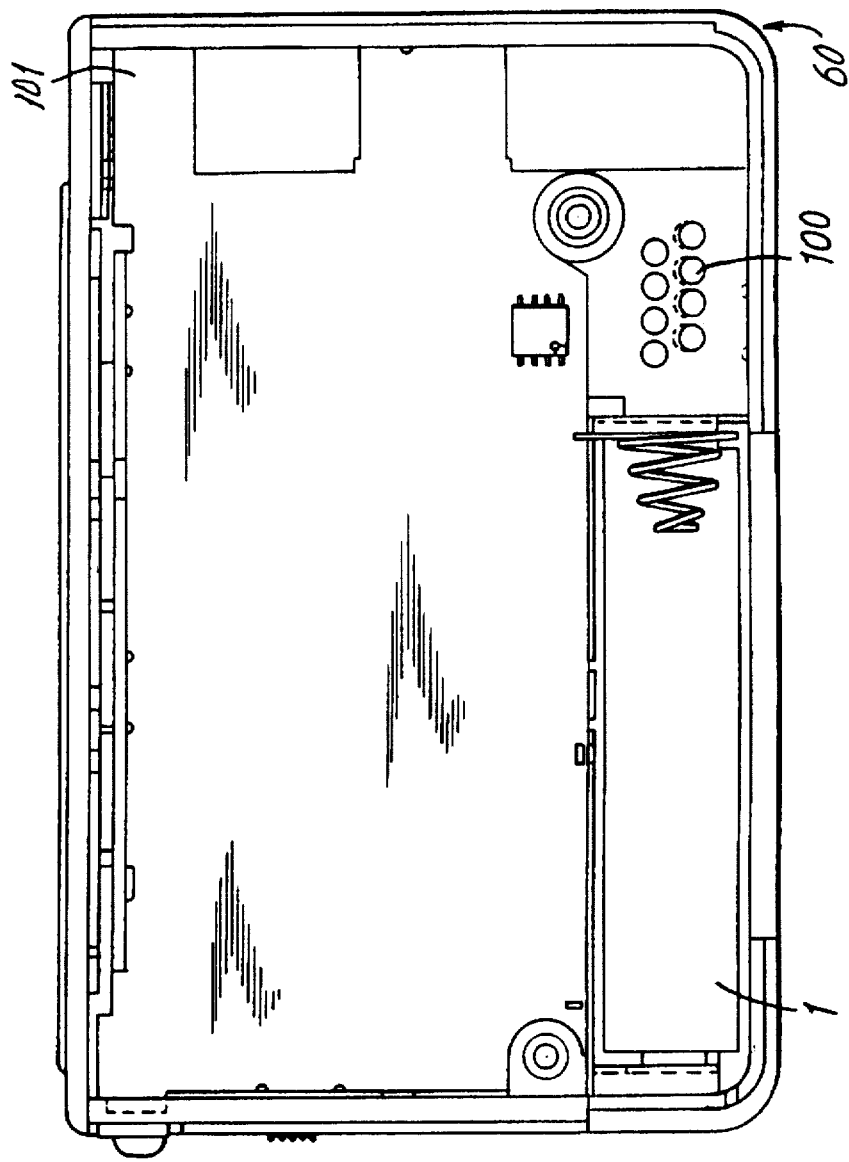
FIG. 12 is a plan view of an identification code read/write device in accordance of another embodiment of the invention.

FIG. 12 illustrates a receiver 60 in accordance with an alternative embodiment of the invention and is substantially similar to device 50 except as noted below. Terminal 60 includes a plurality of terminals 100 provided on a circuit substrate 101. Terminals 100 are positioned at the side of battery casing 1. A terminal protective cover (not shown) is integrally formed with the battery cover (not shown) and overlies terminals 100 when in position. To prevent short circuiting during replacement of a battery, it is preferable to provide a short circuiting preventive member between terminals 100 and battery casing 1. Such a short circuiting preventative member is integrally formed with the battery cover. Terminals 100 can be located at other positions of circuit substrate 101 or on a equivalent substrate member. When the terminal protective cover is provided independently of battery casing 1, however, a relatively complicated structure for receiver 60 is required, access to terminals 100 is more difficult and receiver 50 may be relatively weak in withstanding a charge of static electricity.

The method for reading from and writing into storage element 21 of device 50 information such as an identification code using apparatus 30 is as follows. Initially rear end 32w of arm 32 is depressed toward protrusion 31d of base 31 to separate (i.e., detach) terminals 35 from pallet 33 as shown in FIG. 10. Sides 2e and 2f of front casing cover (i.e., out of casing) 2 of receiver 50 are positioned so as to come into contact with walls 33b and 33a of pallet 33, respectively. Walls 33a and 33b both guide and properly position receiver 50 on pallet 33. When rear end 32w is no longer depressed, terminals 35 rotate towards and come into contact with terminals 20c of substrate 20 by extending through holes 1h. The biasing force required to press terminals 35 against terminals 20c is provided by coil springs 34a and 34b shown in FIG. 3.

As now can be readily appreciated, an identification code read/write device in accordance with the invention permits ready access of terminals 20c of substrate 20 of receiver 50 by inserting terminals 35 of apparatus 30 through a plurality of openings 1h. Terminals 35 are inserted substantially in a direction orthogonal to openings 1h with the terminal protective cover of receiver 50 removed. Since terminals 20c are arranged on substrate 20 so as to lie in a plane which is substantially parallel to a battery case opening 26a (see FIG. 2) with the terminal protective cover (i.e. battery cover 26) removed, holes 1h (which lead to the inner circuitry) can be readily closed to prevent dust and the like from reaching terminals 20c. The need for additional spacing to accommodate guide slits as required by conventional apparatuses is eliminated. Accordingly, the packaging density of device 50 can be increased while providing a device which is relatively small in size and light in weight.

An identification code read/write device in accordance with the invention has a guide portion for guiding the outer casing of the device in at least two directions of a plane with read/write terminal 35 of apparatus 30 being detachably supported relative to terminals 20c of substrate 20. Access to read/write terminals 20c by read/write terminals 35 can be achieved through a simple, single operation. Read/write terminals 35 are sufficiently strong, do not require a complicated design and have a relatively high durability. Apparatus 30 is a relatively simple structure, light in weight, small in size and has a low manufacturing cost.

In reading from and writing into device 50, read/write terminals 35 are spaced from read/write device 50 when device 50 is initially positioned on pallet 33. Device 50 is easily and properly positioned on pallet 33 by having sides 2e and 2f of front casing cover 2 brought into contact with walls 33b and 33a for guiding the former. Read/write terminals 35 are then brought into contact with read/write terminals 20c of substrate 20. Operation of read/write apparatus 30 can be easily controlled by an operator.

It will thus be seen that the objects set forth above and those made apparent from the preceding description are efficiently attained and, since certain changes have been made in the above method and construction set forth without departing from the spirit and scope of the invention, it is intended that all matter contained in the above description and shown in the accompanying drawings shall be interpreted as illustrative and not in any limiting sense.

It is also to be understood that the following claims are intended to cover all the generic and specific features of the invention therein described and all statements of the scope of the invention, which as a matter of language, might said to fall therebetween.

What is claimed is:

1. An apparatus for at least one of writing information into and reading information from a device, said apparatus comprising:

at least one of a read terminal and a write terminal for at least one of reading information from and writing information into said device;

a base for supporting said device:

a connector for selectively positioning at least one of said read terminal and said write terminal relative to said base for selective operative coupling with said device on said base, said connector including an arm for adjusting the position of said at least one read terminal and said write terminal relative to said base;

said device including a circuit substrate having at least two terminal elements which are arranged on the circuit substrate in a first plane, said at least one of said read terminal and said write terminal having ends forming a plane substantially parallel to said first plane, said ends operable for engaging and being disengaged from said terminal elements of said circuit substrate; and wherein the device is enclosed in a housing having an opening which extends in a plane substantially parallel to said first plane and positioned above said terminal elements of said substrate; and wherein said device further includes a battery casing, said opening serving as an opening for said battery casing, said battery casing including a plurality of apertures corresponding to and positioned directly above said terminal elements; and wherein said at least one of said read terminal and said write terminal of said apparatus are operable for passing through said opening and said apertures for engaging and being disengaged from said terminal elements, of said circuit substrate.

2. A device for at least one of receiving and transmitting information, comprising:

a device housing having a front casing and a rear casing;

a battery housing within said device housing, said battery housing including a battery housing bottom portion accessible from outside the device and defining a space within the device, said rear casing having at least one opening therethrough, said at least one opening having a width and providing access to said space; and at least one terminal element through which at least a portion of said information is at least one of written into and read from said device, said battery housing bottom portion defining at least one hole therein at a region thereof essentially parallel and proximate to said front casing, said at least one terminal element being accessible through said at least one hole defined by said battery housing bottom portion, said at least one terminal element also being positioned between said battery housing bottom portion and said front casing and extending essentially parallel to said width of said at least one opening in said rear casing.

3. The device of claim 2, wherein said device further includes a protective cover positioned above said opening so that upon removal of said protective cover from said device said opening is exposed.

4. The device of claim 2, wherein said device includes a storage element for storing at least said portion of said information.

5. The device of claim 4, wherein said portion of said information includes an identification code.

6. The device of claim 4, wherein the storage element is an EEPROM.

7. The device of claim 2, wherein said battery housing bottom portion includes a plurality of said holes corresponding to and positioned directly above said at least one terminal element.

8. The device of claim 7, wherein said holes and said at least one terminal element lie in substantially parallel planes.

9. An apparatus for at least one of writing information into and reading information from a device, said device including an opening therethrough providing access to the interior of the device, said apparatus comprising:

at least one of a read and a write terminal element for at least one of reading information from and writing information into said device;

a base for supporting said device; and a connector selectively positioning at least one of said read terminal element and said write terminal element relative to said base for selectively operative coupling with and movable about a predetermined path relative to said device on said base through said opening, said device including a device housing; a battery housing within said device housing, said battery housing including a bottom portion accessible from outside the device and defining a space within the device, said bottom portion having at least one opening therethrough providing access to said space; and at least one device terminal through which at least a portion of said information can be at least one of written into and read from said device, said at least one device terminal being disposed in the space defined by said bottom portion of said battery housing, said at least one device terminal positioned to face said at least one opening and to extend essentially parallel to the width of said at least one opening.

10. A radio device comprising:

a device casing including a front casing and a rear casing, said rear casing having an opening;

a readable/writable element serving as an identification code memory;

a plurality of terminals connected to said readable/writable element and connectable to a read/write apparatus, said plurality of terminals arranged to be accessed by said read/write apparatus through said opening;

a battery casing within said device casing and formed with a plurality of apertures at a region of said battery casing proximate a region of said front casing, said apertures providing access to said plurality of terminals; and a protective cover constructed to cover said opening, said plurality of terminals being arranged between said respective regions of said battery casing and said front casing and extending essentially parallel to the region of said region of said front casing proximate said apertures, said terminals being exposed upon the removal of said protective cover, and said protective cover being a cover for the battery casing.

11. The radio device of claim 10, said protective cover defining a cover of said battery casing.

* * * * *